April 26, 1960 J. F. STEBER 2,934,207
MACHINE FOR FEEDING AND GRADING PICKLES OR THE LIKE
Filed July 26, 1956 6 Sheets-Sheet 1
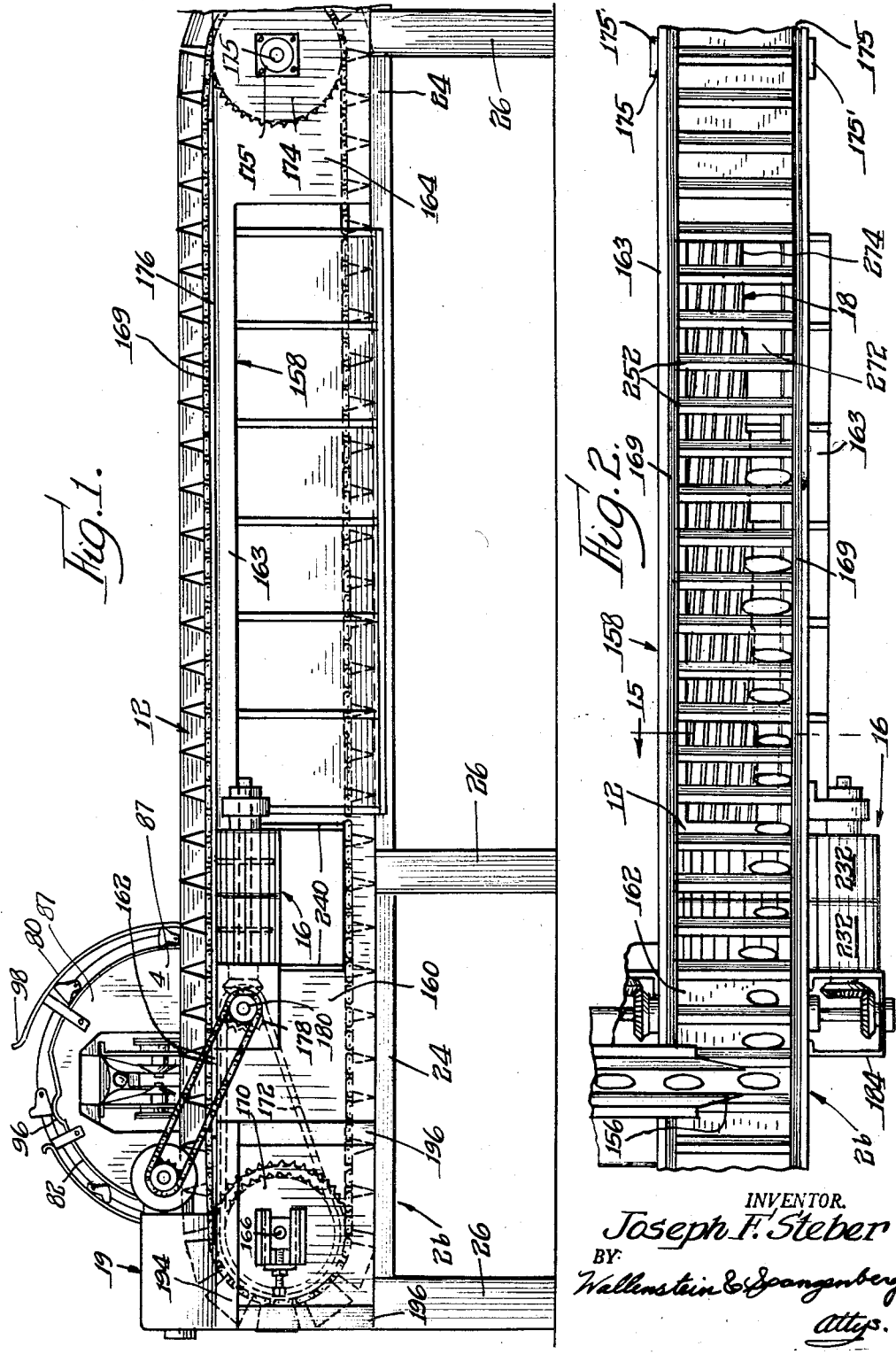
INVENTOR.
Joseph F. Steber
BY
Wallenstein & Spangenberg
attys.

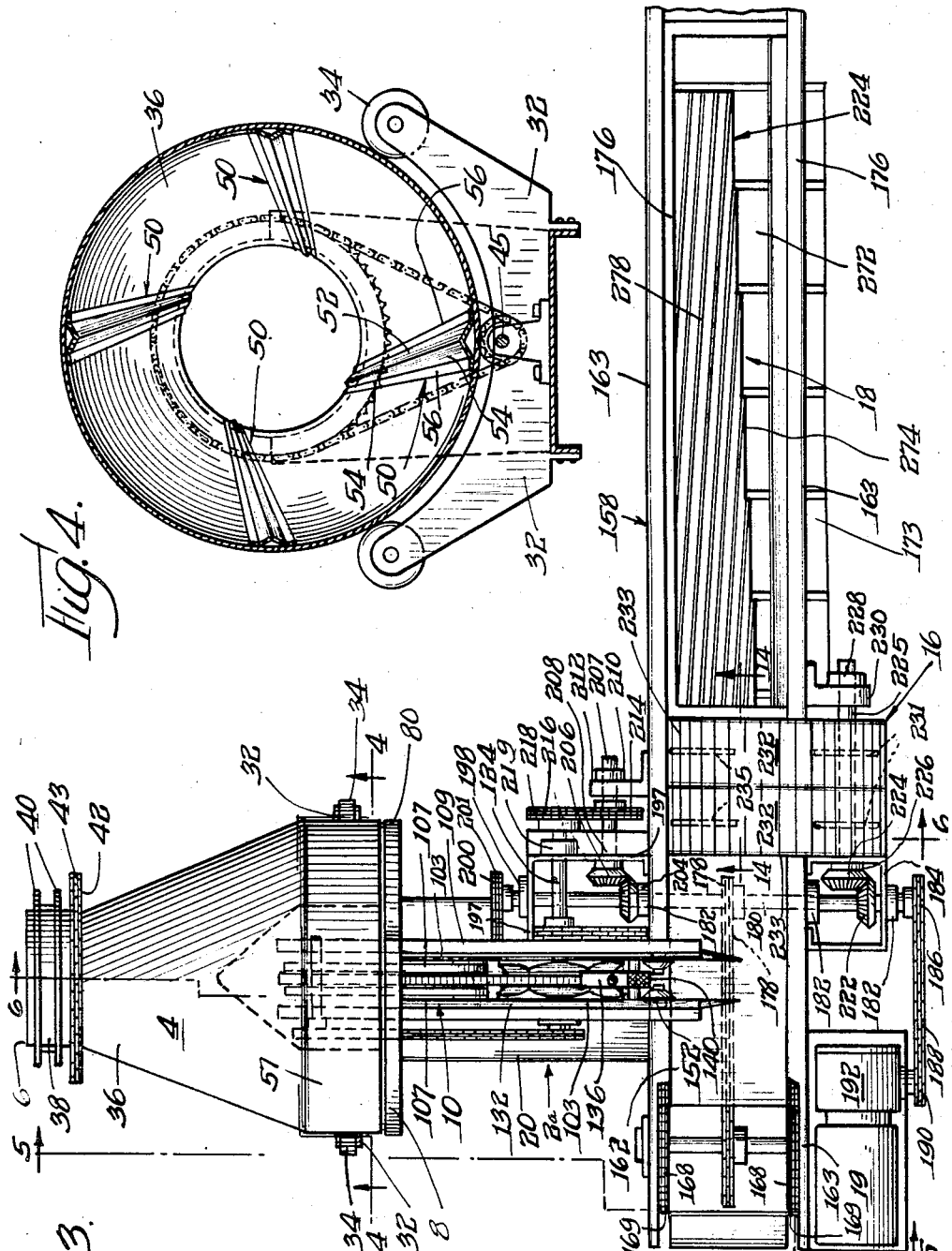

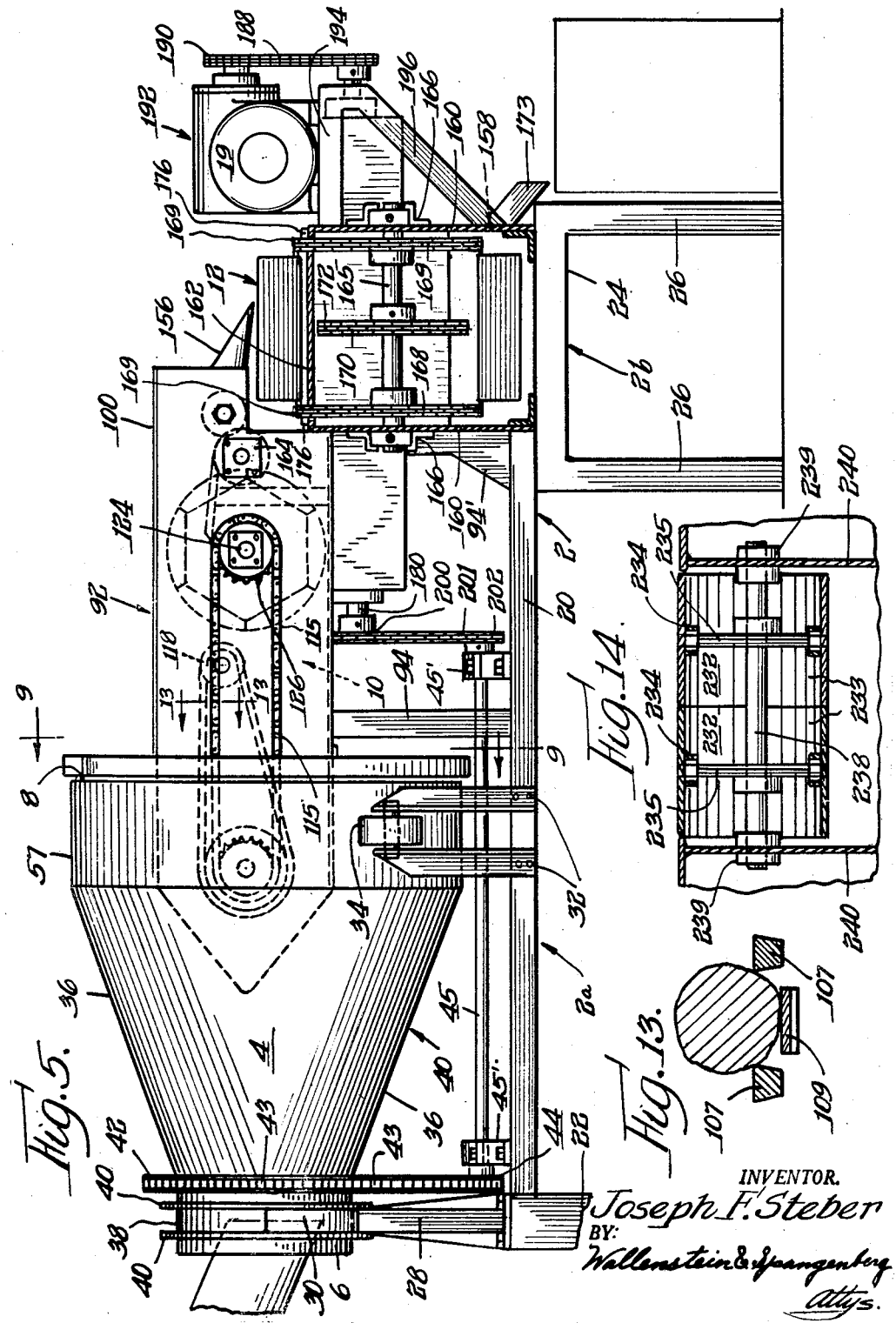

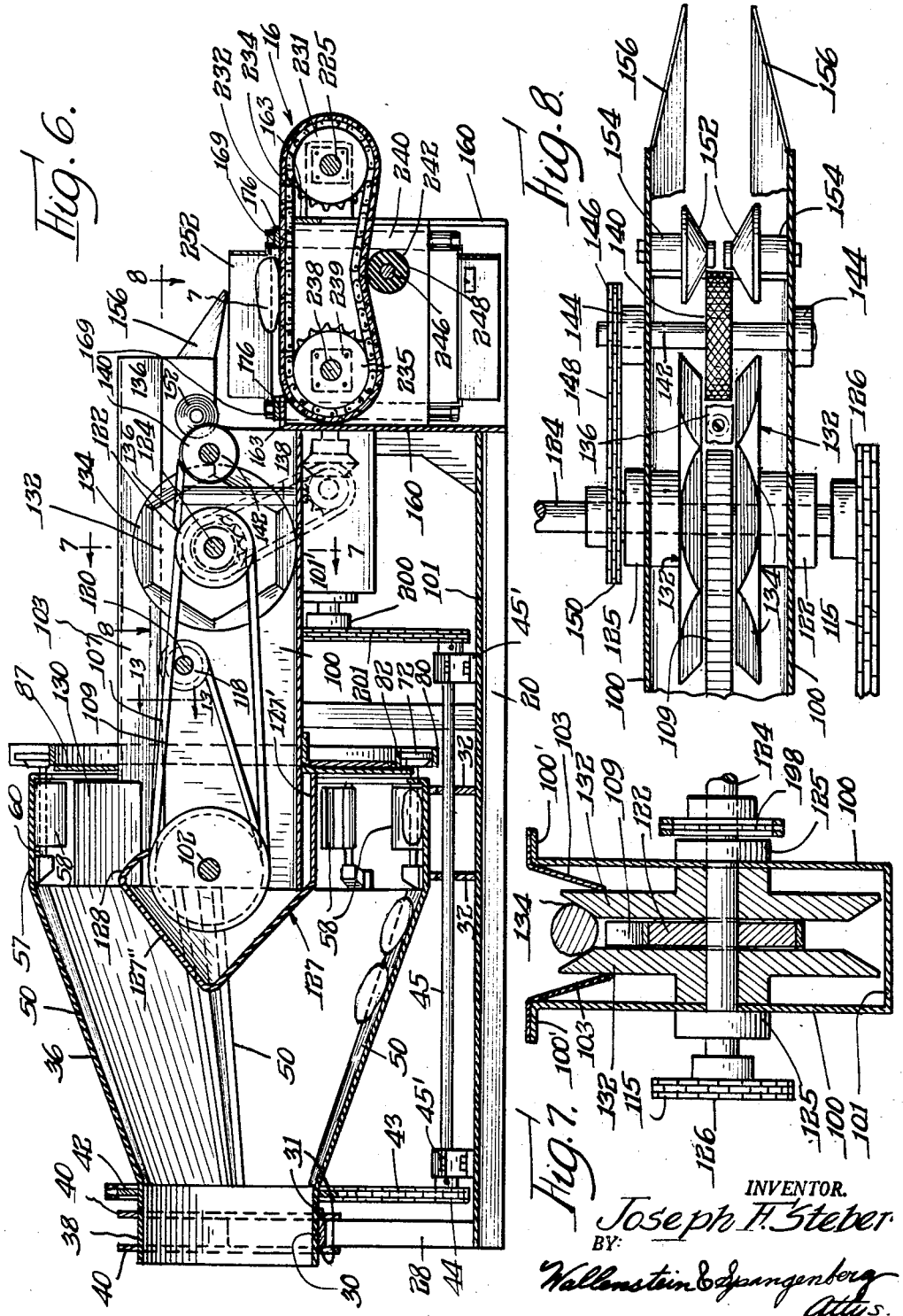

April 26, 1960  J. F. STEBER  2,934,207
MACHINE FOR FEEDING AND GRADING PICKLES OR THE LIKE
Filed July 26, 1956  6 Sheets-Sheet 5
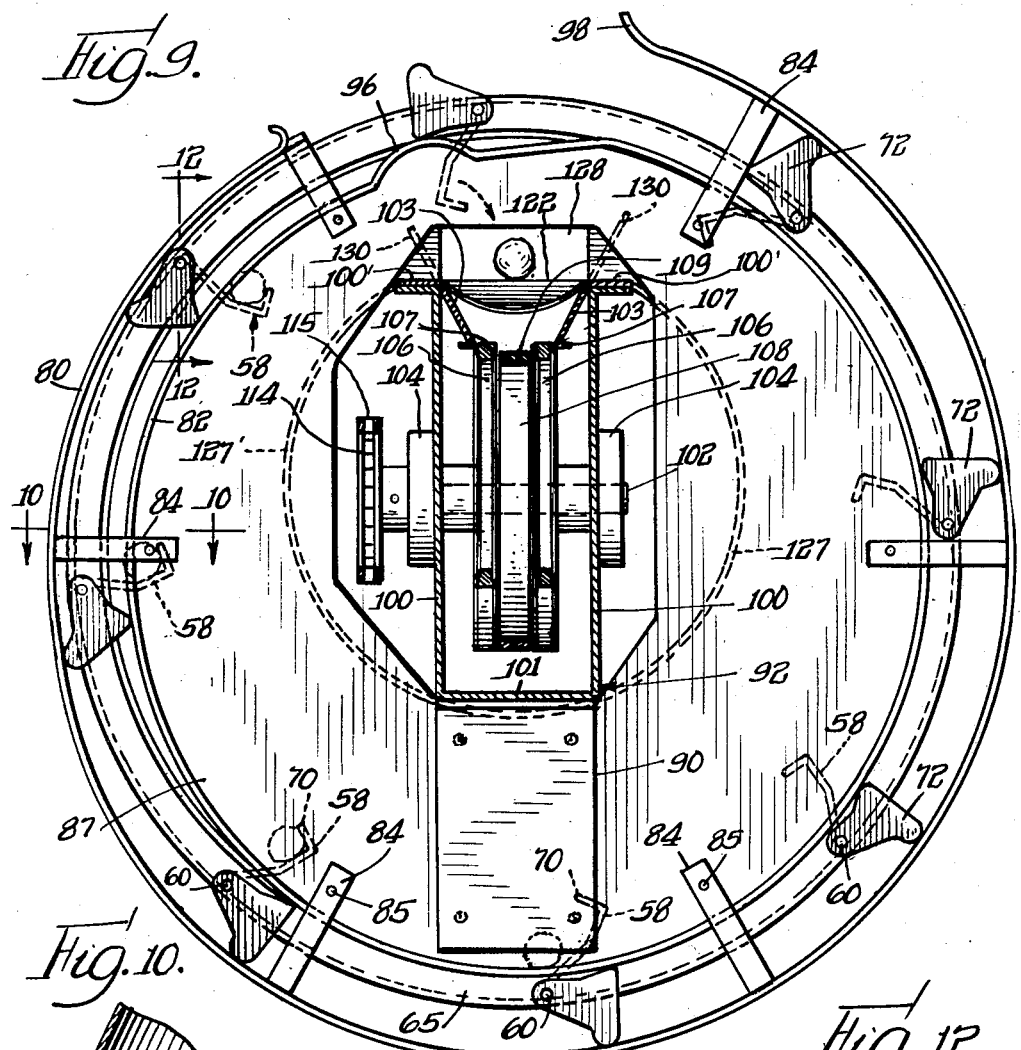
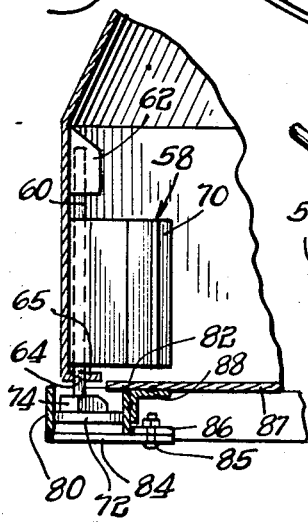
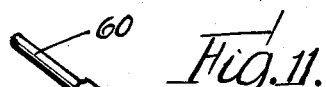
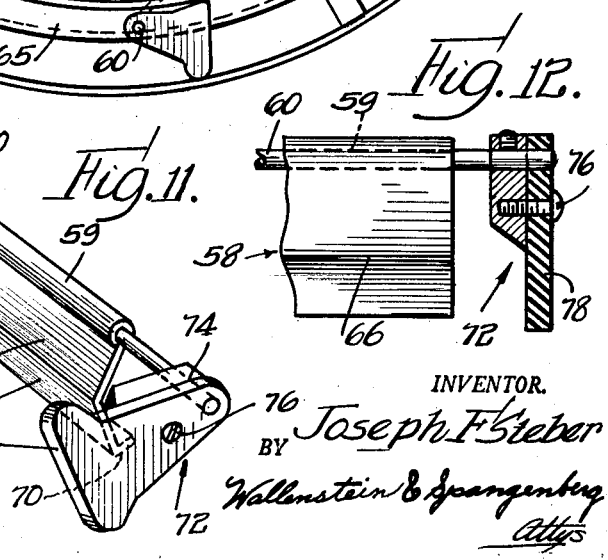
INVENTOR.
Joseph F. Steber
BY Wallenstein & Spangenberg
Attys April 26, 1960         J. F. STEBER         2,934,207
MACHINE FOR FEEDING AND GRADING PICKLES OR THE LIKE
Filed July 26, 1956                          6 Sheets-Sheet 6
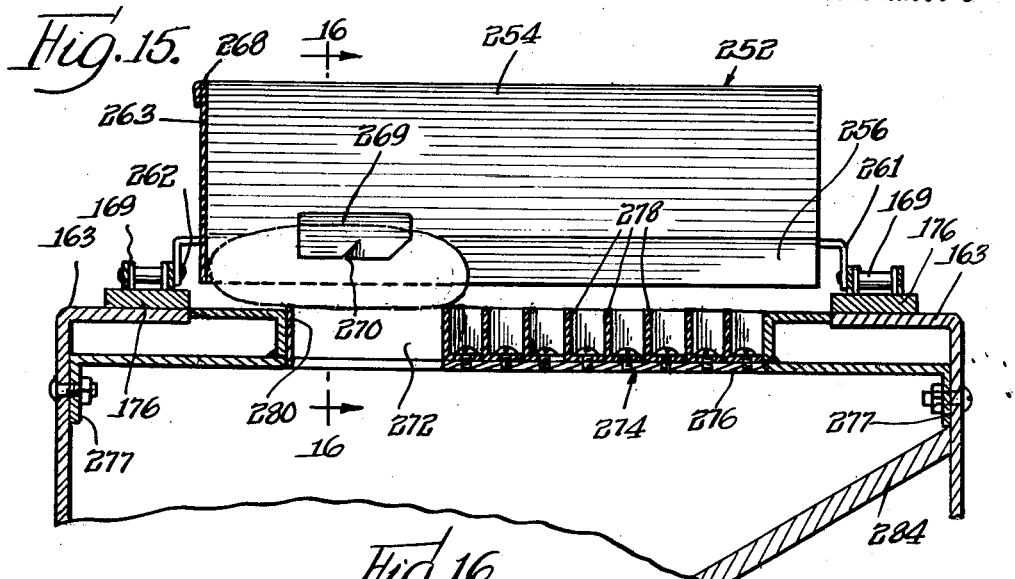
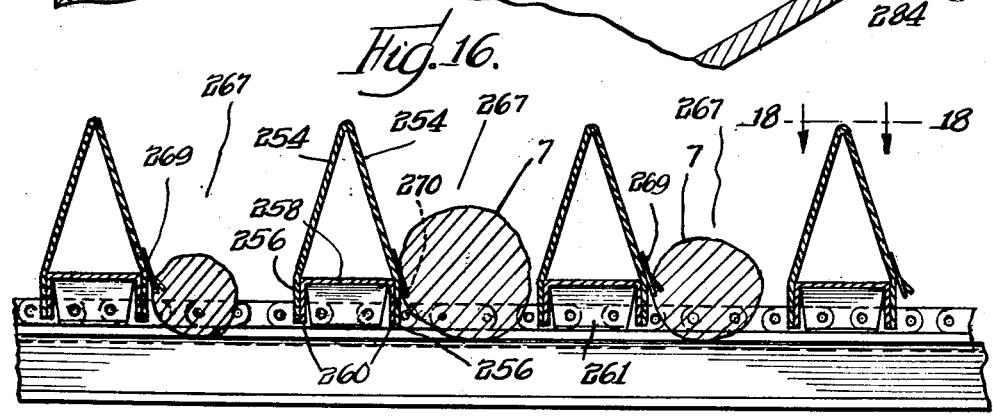
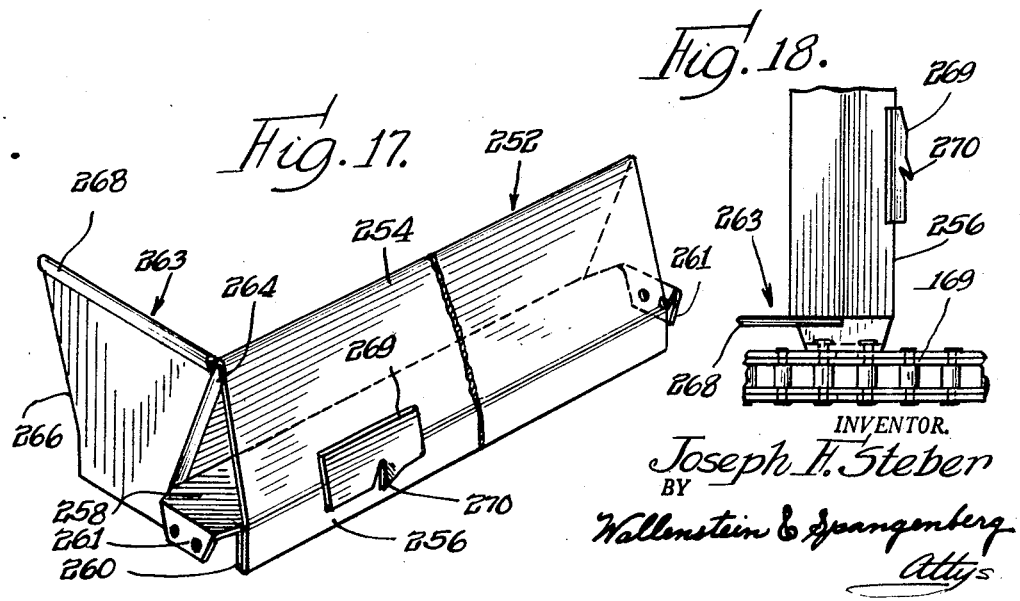
INVENTOR.
Joseph F. Steber
BY
Wallenstein & Spangenberg
Attys United States Patent Office 2,934,207
Patented Apr. 26, 1960

2,934,207

MACHINE FOR FEEDING AND GRADING PICKLES OR THE LIKE

Joseph F. Steber, Green Bay, Wis., assignor of fifty percent to Murray M. Scharf, Green Bay, Wis.

Application July 26, 1956, Serial No. 600,317

18 Claims. (Cl. 209—97)

This application is a continuation-in-part of co-pending application Serial No. 433,378, filed June 1, 1954, now Patent Number 2,813,627, granted November 19, 1957, on a Machine for Feeding and Grading Pickles or the Like.

This invention relates to equipment for automatically feeding pickles one at a time and at a fixed rate to a discharge station, and also to equipment which conveys the pickles to a sorting station where the pickles are sorted automatically by size.

Pickles come in many different sizes and are generally of an irregular shape which create problems in the design of reliable equipment for conveying and sorting them. In merchandizing pickles, premium prices are obtained for pickles of uniform size, particularly of uniform length. Prior to the equipment described herein and in the aforesaid application, there were no commercially satisfactory inexpensive apparatuses for accurately grading pickles and the like as to length even though the demand for such apparatus has existed for many years.

Among the objects of the present invention are: to provide a collecting and feeding means which receives pickles or the like of various sizes and shapes randomly fed thereto, and which automatically conveys pickles one at a time, and preferably at a fixed rate, to a discharge location; to provide apparatus for receiving pickles or the like of various sizes and shapes and orienting the same so that they may be directed to a discharge location where they are received by suitable conveyor means or suitable equipment requiring a particular orientation of the same; and to provide a machine for grading pickles or the like where they are suitably held in a given position as they are carried over the grading portion of the machine, so that they may be accurately graded as to length, quickly, automatically, reliably and inexpensively.

In accordance with one aspect of the invention, an open-ended feed drum, preferably one having a main frusto-conical portion terminating in a cylindrical position at the wide end thereof, is mounted for rotation about a generally horizontal axis. Pickles fed into the narrow end of the drum are thus carried by force of gravity into the wide end thereof. Pivotally mounted in the cylindrical portion of the drum are a series of circumferentially spaced, preferably hook-shaped, carrier-plate members. These carrier plate members are mounted for rotation about longitudinally extending rock shafts carrying guide dogs on the ends thereof. These guide dogs are normally confined between generally circular stationary guide rails which fix the orientation of the carrier members such that the carrier members are orientated to form support pockets for the pickles or the like. The frusto-conical portion of the drum has a number of longitudinally extending ribs which agitate and guide the pickles and aid in aligning the pickles reaching the lower end of the drum so that their axes extend along the length of the drum.

Extending into the wide end of the drum is a conveyor belt system of novel design and construction which receives pickles from the carrier members at the top of the drum and directs them at the proper rate and in the proper position to a discharge station past which a number of pusher members are moved over a platform extending transversely of the conveyor system. The conveyor system includes a pair of outer endless belts between which extends an intermediate belt whose path of travel includes a position which is spaced somewhat below the path of travel of the outermost belts, thereby providing a pocket for receiving and centering pickles directed to these belts. The pickles are discharged onto these belts from the drum carrier plate members by a cam track which engages the guide dogs at the top of the drum and moves the same to a position which tilts the carrier members to a position where the pickles drop therefrom onto the conveyor belts.

The intermediate carrier belt passes between a pair of spaced feed wheels having a tapered inner surface forming a tapered channel which engages the pickles in the intermediate belt and raises the same therefrom. Preferably, the tapered inner surfaces of these feed wheels are constituted by a number of roughened planar surfaces arranged around the axis of rotation of the feed wheels in polygonal fashion to form a number of individual straight-bottomed recesses for the pickles. The pickles are thus orientated longitudinally of the straight bottoms of these recesses. The pickles may be fed to a number of auxiliary intermediate feeding elements which convey the pickles in proper orientation and timed relation to the aforementioned pusher members.

The pusher members, which, as stated above, are moved over a platform, each preferably includes a main body portion extending transversely of the direction of movement thereof and from which extends an aligning and retaining wall against which the pickles are moved by a transverse conveyor means moving beneath an open portion of the platform so that the ends of the pickles associated with the conveyors are in alignment when moved to the sorting apparatus. Each of the pusher members is provided with a sharp projection which pierces the pickle in front of it to hold the same in place to prevent the pickle from rolling to maintain the transverse alignment thereof. The pushers move the pickles to a sorting station where an opening is provided having a straight longitudinal edge and an opposite longitudinal edge providing a stepped or tapered opening increasing in width in the direction of movement of the pushers. The latter longitudinal edge is preferably rimmed by longitudinally extending ribs providing support surfaces of limited area over which the pickles slide. Due to the limited area of contact between the pickles and the ribs, the frictional forces between the pickles and the ribs are at or near a minimum thereby inhibiting rolling movement of the pickles. The pickles pass through the sorting opening when they reach a point therealong having a width equal to or greater than the length of the pickles. Bins for collecting pickles of varying ranges of size may be spaced longitudinally of and below the sorting opening so that the pickles are automatically sorted and collected by size.

Other features of the invention relate to other details of construction of the machine, and in the novel relationships between component parts thereof.

Other objects, advantages and features of the invention will become apparent to those skilled in the art upon reference to the accompanying specification, claims and drawings wherein:

Fig. 1 is a front elevational view of the feeding and sorting equipment;

Fig. 2 is a plan view of a portion of the equipment shown in Fig. 1;

Fig. 3 is a plan view of the equipment in Fig. 1, with the pusher members and conveyor chains removed to show certain details of construction of the equipment;

Fig. 4 is a sectional view through the feed drum in Fig. 3, taken along the section line 4—4;

Fig. 5 is an end elevational view in partial section of the feeding and sorting equipment, taken along line 5—5 in Fig. 3;

Fig. 6 is a view corresponding to the view in Fig. 5, with the equipment seen in vertical section, taken along section line 6—6 in Fig. 3;

Fig. 7 is a fragmentary sectional view through part of the equipment shown in Fig. 6, taken along section line 7—7;

Fig. 8 is a fragmentary plan view of the apparatus shown in Fig. 7 taken along line 8—8 in Fig. 6 with the guide plates 103—103 removed therefrom;

Fig. 9 is an enlarged vertical sectional view, taken along section line 9—9 in Fig. 5, and shows the construction of the feed drum and part of the conveying mechanism extending therein;

Fig. 10 is a fragmentary enlarged sectional view of the feed drum, taken along section line 10—10 of Fig. 9;

Fig. 11 is an enlarged perspective view of the pickle carrier members and associated control elements associated with the feed drum;

Fig. 12 is a sectional view through the control elements, taken along section line 12—12 in Fig. 9;

Fig. 13 is a sectional view of a portion of the conveyor belt system extending from the feed drum, taken along section line 13—13 in Fig. 6;

Fig. 14 is a sectional view through the pickle-aligning conveyor associated with the sorting apparatus, taken along section line 14—14 in Fig. 3;

Fig. 15 is an enlarged transverse vertical section through the sorting apparatus, taken along section line 15—15 in Fig. 2;

Fig. 16 is a longitudinal vertical section through the sorting apparatus, taken along section line 16—16 in Fig. 15;

Fig. 17 is a perspective view of one of the pusher members associated with the sorting apparatus; and Fig. 18 is a fragmentary plan view of the pusher member of Fig. 17.

Referring now more particularly to Figs. 1, 2, 3 and 5, the feeding and sorting equipment of the invention includes a support frame structure generally indicated by reference numeral 2, an open-ended feed drum 4 having an inlet end 6 into which pickles 7 are randomly fed and an outlet end 8 from which pickles are removed from the drum at a fixed rate and in a definite orientation by a conveyor belt system 10, feeding apparatus 12 which receives pickles discharged from the conveyor belt system 10 and moves the same to pickle-aligning conveyor means 16 and then to sorting apparatus 18 where the pickles are sorted or graded by length, and a power source 19 in the form of an electric motor which drives all the operating instrumentalities of the invention.

The support frame structure for the equipment includes a frame section 2a including a platform 20 made from a channel-shaped piece of sheet metal which supports the feed drum 4 and the conveyor belt system 10, the platform being in part supported by legs 22. One end of the platform 20 rests upon platform 24 associated with support structure section 2b having support legs 26. Platform 24 supports the feeding apparatus 12, pickle-aligning conveyor 16, sorting apparatus 18, and the motor 19.

The platform 20 of support section 2a has mounted at the rear thereof a saddle bracket 28 which provides a U-shaped bearing seat 30 which terminates in flat vertical front and rear walls 31—31. Supported on the platform 20 in front of the saddle bracket 28 are a pair of U-shaped brackets 32—32. A pair of drum-supporting rollers 34—34 are journaled between the upper ends of the brackets 32—32. The rollers 34—34 and bearing 30 rotatably support the drum 4 for rotation about a horizontal axis.

The drum 4 has a frusto-conical main body portion 36 which at its narrow rear end joins a cylindrical neck 38. A pair of axially spaced flanges or rings 40—40 are fixed around the drum neck 38. These flanges straddle the flat sides 31—31 of the saddle bracket 28 and thereby fix the position of the drum on the platform 20.

Also secured around the drum neck 38 is a sprocket wheel 42 around which extends a drive chain 43 for rotating the drum. The chain 43 extends around a drive sprocket wheel 44 fixed to a horizontal shaft 45 journaled in bearings 45'—45' carried on the platform 20. The transmission system which drives the shaft 45 from the motor 19 will be hereinafter described.

Referring now more particularly to Figs. 4 and 9, the frusto-conical portion 36 of the drum has fixed to the inner surface thereof a number of generally longitudinally extending ribs 50, there being four such equally spaced ribs. The ribs preferably are inclined circumferentially with respect to associated slant-height lines of the conical portion 36 of the drum in a direction opposite to the direction of rotation of the drum. The ribs are each formed from a piece of sheet metal bent to form a triangular central portion having inclined walls 52—54 and longitudinal flanges 56—56 which are secured to the drum interior. These ribs agitate the pickles dumped into the drum and aid in aligning the pickles so that the long axes, therefore, extend generally along the length of the drum.

The wide end of the frusto-conical portion 36 of the drum terminates in a cylindrical portion 57 having an axial length at least as large as the largest pickle to be accommodated by the drum. Secured to the inside of the cylindrical drum portion 57 are a number of circumferentially spaced pickle carrier plate members 58. Each of the carrier members has a looped portion 59 (Fig. 11) which surrounds and is fixed to a shaft 60 which at one end is journaled in a bearing 62 fixed to the drum interior at the rear end of the cylindrical drum portion 57 and at the other end is journaled in an opening 64 formed in an interned flange 65 formed at the front of the drum. The main body of the carrier members have obtusely angled planar wall sections 66—68 (Fig. 11) extending in planes parallel to the longitudinal axis of the drum and a short outer lip 70. When the carrier members are orientated so that the lips 70 thereof extend generally upwardly, a pocket or trough is formed for carrying pickles or the like. The carrier members are mounted so that the lips 70 face generally in the same circumferential direction as the direction of rotation of the feed drum.

The angular position of the carrier members are each controlled by a guide dog 72 secured to a block 74 by a screw 76, the block in turn being fixed to the associated shaft 60. The guide dog 72 has an enlarged end 78 which rides in a trackway formed by a pair of radially spaced, generally circular rails 80—82. The rails 80 and 82 are connected together by means including strips 84 which are welded to the outermost rail 80 and bolts 85 extending through strips 84 and a smaller strip 86 (Fig. 10) welded to the inner rail 82. The inner rail 82 is secured to a large plate 87 mounted in the opening of the feed drum by angle members 88 welded to the inner rail 82 and the plate 87. Plate 87 in turn is mounted by an angle bracket 90 to the bottom of a metal frame 92 which supports the components making up the conveyor belt system 10. The frame 92 is supported upon the platform 20 by support brackets 94—94'.

As shown most clearly in Fig. 9, the track defined between the rails 80 and 82 positions the guide dogs 72 so that the lips 70 extend generally in the direction of rotation of the drum and act as scoops picking up pickles which have fallen into the cylindrical drum section 57. The carrier members carry the pickles to the top of the drum where means are provided for discharging the pickles therefrom. This means includes a protuberant portion 96 at the top of the inner rail 82. At this point, a gap is provided in the outer rail 80 so that the guide dogs riding upon the protuberant portion 96 are free to turn or pivot under control of the protuberant rail portion 96. The guide dogs are successively raised to positions where the lips 70 are tilted below the horizontal, allowing the pickles to roll off the carrier members. After a pickle has been discharged from a carrier member, the associated guide dog once again enters the track defined between the rails 80 and 82, the outermost rail 80 being flared at 98 to properly guide the dog into position between the rails.

The discharged pickles fall upon the conveyor belt system 10. The frame 92 for this carrier belt system has spaced vertical side walls 100—100 having narrow flanges 100'—100' at their tops and are joined by a bottom wall 101. A pair of sheet metal members 103—103 forming downwardly converging guide walls between the frame sides 100—100. A shaft 102 is rotatably journaled in bearings 104—104 (Fig. 9) secured to the side walls 100—100. Fixed to the shaft 102 between the walls 100—100 are a series of pulley wheels, outer pulley wheels 106—106 which drive pulley belts 107—107 and intermediate pulley wheel 108 which drives a belt 109. Secured to the shaft 102 at the side of the frame 92 is a sprocket wheel 114 which receives an endless chain 115. The shaft 102 and the pulleys carried thereby are driven by the chain 115.

The belts 107—107 on the outer pulley wheels extend around respective idler pulley wheels 118—118 fixed to a shaft 120 journaled for rotation between the frame sides 100—100. The intermediate belt 109 extends around an idler pulley wheel 122 which is mounted for free rotation about a shaft 124 (Figs. 6 and 7) journaled in bearings 125—125 secured to the frame sides 100—100. In the vicinity of the pulley wheels 106—106 and 108, the belts 107—107 and 109 are at approximately the same elevation. However, the path of travel of the outer belts 107—107 at a point spaced from the latter pulley wheels are appreciably higher than the path of travel of the intermediate belt 109, as shown most clearly in Fig. 13. The three belts, which are contiguous at their sides, thereby provide a pocket for the pickles conveyed by the conveyor belt system for positioning the pickles transversely thereof.

As shown most clearly in Figs. 5 and 7 shaft 124 carries a drive sprocket wheel 126 on the outside of the frame 92 which receives the other end of the aforementioned endless chain 115 which drives the shaft 102 carrying the pulley wheels 106—106 and 108.

The frame 92 for the conveyor belt system extends into the wide end of the drum through an opening formed in the plate 87. The portion of the frame 92 which journals the shaft 102 and the attached pulley and sprocket wheels are located well within the drum opposite the rear or inner portion of the large cylindrical section 57 thereof. Contact between the pickles in the feed drum and the pulley wheels, sprocket wheel and the chain 115 are prevented by a sheet metal enclosure generally indicated by the reference numeral 127 (Fig. 6) which is fixed to the rear of the plate 87. The enclosure 127 includes a substantially cylindrical portion 127' which encloses the end of the frame 92 except at the top thereof where an opening is provided for the passage of pickles dropped from the carrier members onto the conveyor belts 107—107 and 109. The cylindrical portion 127' joins a conical end portion 127" which terminates immediately above the conveyor belts in a guide wall 128. Downwardly and inwardly inclined walls 130—130 are provided for guiding the pickles dropped from the carrier members to the region where the conveyor belts 107—107 and 109 are located.

As illustrated most clearly in Fig. 6, the outer conveyor belts 107—107 pass around their associated pulley wheels at a point substantially rearwardly of the pulley wheel 122 around which the intermediate pulley belt extends. The pulley wheel 122 is closely flanked by a pair of feed wheels 132—132 fixed to the shaft 124. The feed wheels are designed to remove pickles one at a time from the intermediate conveyor belt 109 and direct them at the proper instant toward the conveyor apparatus 12 in a manner to be explained. The diameters of the feed wheels 132—132 are substantially greater than the pulley wheel 122 and, as shown most clearly in Figs. 6, 7 and 8, each has a number of roughened, downwardly and inwardly inclined planar surfaces 134—134, etc. arranged in polygonal fashion around the axis of the wheel. The respective planar surfaces of the feed wheels are mounted opposite one another to provide a number of straight-bottomed pockets falling along the sides of a polygon having equal length sides. The innermost points of the surfaces are spaced together an amount less than the diameter of the smallest pickle to be accommodated by the machine. The planar surfaces are roughened so that as a pickle is delivered between the wheels 132—132 of the conveyor belt 109, they are gripped and raised one at a time by the feed wheels, the pickles arranging themselves under force of gravity parallel to the bottoms of the aforementioned pockets provided by the wheels. Since the conveyor belt 109 must pass between the feed wheels, the smallest pickle to be accommodated by the conveyor system must be somewhat larger than the width of the conveyor belt 109 so that the inclined surfaces of the feed wheels may engage these pickles. In this manner, the feed wheels deliver pickles at a fixed rate and with the proper orientation to the various instrumentalities which follow the feed wheels.

At the front of the feed wheels is a slightly downwardly and forwardly inclined plate 136 supported by a post 138 fixed to the frame 92. The plate 136 receives the pickles as they drop from the front portion of the feed wheels 132—132.

The plate 136 directs the pickles one at a time to a rough-surfaced auxiliary wheel 140 fixed to a shaft 142 journaled in bearings 144—144 (Fig. 8) secured to the frame sides 100—100. The shaft 142 carries a sprocket wheel 146 which is driven by a chain 148 extending around a drive sprocket wheel 150 fixed to the shaft 124.

Rough surfaced auxiliary wheel 140 directs the pickles one at a time between a pair of conical guide wheels 152—152 freely mounted upon pivot rods 154—154 secured to the frame sides 100—100. The pickles then fall between guide plates 156—156 which are located directly above the conveyor apparatus 12.

The conveyor apparatus 12 is supported upon a framework, generally indicated by the reference numeral 158, supported upon platform 24. The framework 158 includes vertical sidewalls 160—160 adjacent to the conveyor belt system 10 which are bridged by a platform 162. Formed integrally with the framework 158 and extending for a substantial distance from the platform 162 are angle-shaped top rails 163—163 which at the far end of the frame join a pair of vertical wall sections 164—164 forming support legs which rest upon the platform 24.

A shaft 165 is journaled in adjustable flanged bearings 166—166 secured to the frame sidewalls 160—160. Between the latter walls, the shaft 165 carries a pair of laterally spaced sprocket wheels 168—168 around which extend endless chains 169—169. The shaft 165 also carries between the sprocket wheels 168—168 another sprocket wheel 170 around which extends an endless chain 172. The outer chains 169—169 pass around respective sprocket wheels 174—174 (Fig. 1) at the opposite end of the frame 158 which sprocket wheels are fixed to a shaft 175 journaled in bearings 175'—175' fixed to the far end sidewalls 164—164 of the frame 158. The chains 169—169 slide upon support strips 176—176 (Fig. 6) fixed to the tops of the frame rails 163—163.

The intermediate chain 172 which passes around the sprocket wheel 170 passes around a drive sprocket wheel 178 (Figs. 1 and 3) fixed to shaft 180 journaled in flanged bearings 182—182 secured to the side walls 160—160 of the framework 158. The shaft 180 extends beyond one of the frame side walls and passes through a box-like bracket 184 secured to the latter side wall. Another flanged bearing 182 fixed to the box-like bracket 184 journals one of the outer ends of the shaft 180. The shaft 180 carries a sprocket wheel 186 which receives an endless chain 188 driven from a drive sprocket wheel 190 secured to the shaft extending from speed reduction gear mechanism 192 driven directly from the electric motor 19. As shown most clearly in Fig. 5, the motor 19 and the gear reduction apparatus 192 is supported upon a platform 194 which is mounted upon the frame side wall 160 by brackets 196—196. The sprocket wheels 168—168 associated with chains 169—169 are thus driven by the motor 19 via the gear reduction mechanism 192, sprocket wheel 190, chain 188, sprocket wheel 186, shaft 180, sprocket wheel 178, chain 172, sprocket wheel 170, and shaft 165 carrying the sprocket wheels 168—168.

The shaft 180 constitutes the main drive shaft of the transmission system and this shaft extends an appreciable distance beyond the other frame side wall 160, passing through a box-like bracket 197 mounted to the latter side wall. Mounted to the outer side of the box-like bracket 197 is a flanged bearing 198 which also journals the shaft 180. The shaft 180 contiguous to the latter bearing carries a sprocket wheel 200 around which passes a chain 201 which also extends around the sprocket wheel 202 fixed to the end of the drive shaft 45 (Fig. 5) which controls rotation of the feed drum.

Secured to the shaft 180 within the box-like bracket 197 is a bevel gear 204 which meshes with bevel gear 206 secured to a shaft 207 which at one end is journaled in a bearing 208 secured to the sides of the bracket 197. The other end of the shaft is journaled in a bearing 210 carried by a bracket 212 secured to the housing side wall 160. The shaft 207 carries a sprocket wheel 214 around which passes a chain 216 which extends around a sprocket wheel 218 fixed to the above-mentioned shaft 124 to which the feed wheels 132—132 are mounted. The shaft 124 extends an appreciable distance beyond the frame side wall 160 and in so doing passes through the box-like bracket 197 and is journaled in a flanged bearing 219 secured to the latter bracket. As previously stated, the rotation of the shaft 124 imparts rotation to the conveyor belt system 10 via the sprocket wheel 126 carried on the end thereof and the associated chain 115. Also, the shaft 124 drives the auxiliary wheel 140 via the sprocket wheel 150, chain 148 and sprocket wheel 146 secured to the shaft 142.

Another power take-off from the shaft 180 includes bevel gear 222 fixed to the shaft 180 within the box-like bracket 184. The latter bevel gear meshes with a bevel gear 224 carried upon a shaft 225 journaled at one end in a bearing 226 fixed to the bracket 184 and at the other end in a bearing 228 fixed to a bracket 230 mounted upon the frame sidewall 160.

The shaft 225 carries a pair of drive sprocket wheels 231—231 of the pickle aligning conveyor 16 which wheels drive a pair of continuous conventional flat-top type chains 232—232. The chains 232 may each be formed of strips of metal 233 (Fig. 3) pivoted to the adjacent strips in any suitable manner. Secured to the bottom of each strip may be a conventional chain link 234 (Fig. 14) which is engaged by the teeth or points of the sprocket wheels. The flat top chain also passes around a pair of sprocket wheels 235—235 fixed to a shaft 238 journaled in bearings 239—239 secured to vertical support plates 240—240 fixed to the frame sides 160—160. A rubber idler roller 242 fixed to a shaft 246 journaled between the plates 240—240 engages the bottom sections of the chains 232—232.

The upper sections of the flat top chains 232—232 pass through a slot in the right hand rail 163 as viewed in Fig. 6 and are flush with the platform 162. The flat top chains are moved in a direction such that the upper sections thereof move away from the outlet end of the conveyor belt system 10 to align the pickles in a manner to be explained hereinafter.

The means for moving the pickles discharged from the conveyor belt system 10 to the sorting equipment 18 includes pusher elements 252 carried by the chains 169—169. These pusher members each includes a sheet metal body bent to form a pair of inclined wall sections 254—254 which converge at the tops thereof, and a pair of vertical wall sections 256—256 depending from the bottom of the wall sections 254—254. Secured between the vertical wall sections 256—256 is a sheet metal piece including a horizontal panel 258 which projects a short distance beyond the ends of the wall sections 256—256 and depending flanges 260—260 which are spotwelded or otherwise secured to the inner surfaces of the vertical wall sections 256—256. Depending from the ends of each horizontal panel 258 are mounting tabs 261—261 which are secured to the chain links by rivets 262 (Fig. 15) passing through holes in the mounting tabs 261. A sheet metal piece 263 forming a pickle aligning and retainer wall is secured to the pusher member body as by spot welding a bent over end 264 to the inner surface of one of the inclined walls 254. The sheet metal piece 263 has an inclined outer edge 266 of a size and angle corresponding to the length and inclination of the inclined wall 254 of the adjacent pusher member so that when the pusher members are positioned side by side a number of pickle retaining compartments 267 are provided. To avoid sharp edges, the tops of the sheet metal retainer walls 263 are bent over to form a smooth top 268.

Secured to each leading inclined pusher wall 254 is a pickle impaling element 269 having a forwardly extending penetrating point 270 struck therefrom. The impaling elements 269 are each positioned nearest the end of the pusher member containing the retainer and aligning wall 263 so that the smallest of the pickles will be impaled by the points 270. When a point 270 pierces a pickle, the pickle is held in a fixed position relative to the pusher members to prevent rolling the pickles out of position required for sorting. The pickles are moved into position with their ends touching the aligning walls 263 by means of the conveyor apparatus 16 just described.

The pusher members convey the aligned pickles to the sorting apparatus 18, which is most clearly shown in Figs. 2, 3 and 15. The apparatus 18 includes means which provide a stepped opening 272, each section of which has a progressively increasing width proceeding toward the discharge end of the conveyor apparatus. The respective minimum widths of the various sections of the opening 272 correspond with the minimum lengths of the various ranges of pickle sizes to be sorted by the pickle grading apparatus. The opening 272 is formed by an assembly 274 secured between the top rails 163—163 of the frame 158. The assembly 274 includes a base plate 276 having the stepped opening 272 cut therein and flanges 277—277 on the sides thereof which are secured to the vertical wall of the rails 163—163. Mounted upon the base plate 276 are a number of transversely spaced angle strips 278, the vertical arms of the angle-members adjacent the opening 272 extending along the stepped edges thereof.

The stepped opening 272 has a straight longitudinal edge opposite the stepped edge thereof, and extending along the straight edge is a pickle support strip whose upper edge is at the same elevation as the tops of the vertical arms of the angle strips, which in turn are flush with the tops of the flat-top chains 132—132 of the pickle-aligning conveyor 16. The vertical arms of the angle strips 278 provide relatively small areas of contact with the pickles thereby minimizing the possibility that frictional resistance will cause rolling of the pickles as the pusher members convey the pickles over the angle strips. Such rolling motion may tend to cause the pickles to move away from points 270 and otherwise disturb the proper transverse orientation of the pickle axes. When an end of a pickle is moved away from the supporting vertical arm of an angle strip, it falls into the opening 272 and into one of a number of chutes 173 leading to respective bins where pickles of approximately the same size are gathered together.

In résumé, the operation of the machine is as follows: Pickles are fed at random into the narrow open end of the rotating feed drum 4 where the pickles roll toward the bottom of the rotating drum from the force of gravity. The pickles are agitated by the ribs 50 of the frusto-conical portion 36 of the feed drum. This tends to orient the pickles so that their longitudinal axes extend generally along the length of the drum. The lowermost pickle moving into the cylindrical portion 57 of the feed drum is scooped up by one of the carrier members 58 and conveyed to the top of the drum. Other pickles are successively scooped up by successive carrier members in a like manner. When the carrier members reach the top of the drum, the guide dogs associated therewith leave the outer rail 80 and engage the protuberant portion 96 of the inner rail which tilts the carrier members, causing the pickles to roll therefrom and drop onto the conveyor belts 107—107 and 109. The inclined guide walls 103—103 keep the pickles on the conveyor belts. At this point, the long axes of the pickles extend generally in the direction of movement of the conveyor belts. As the path of travel of the intermediate conveyor belt 109 drops below the tops of the outer conveyor belts 107—107, the pickles drop into the resultant pocket formed thereby and are thus aligned transversely of the conveyor.

The pickles are then brought between the inner inclined faces of the feed wheels 132—132, and, due to the roughened surface thereof, and to the tapering thereof, are lifted off of the intermediate conveyor belt. Under force of gravity, the pickles align themselves parallel to the flat-bottoms of the various pockets of the wheels 132—132. The feed wheels which are rotated in synchronism with the movement of the pusher members 252, precisely determine the time of feed of the pickles to the compartments defined between the pusher members. The auxiliary rough surfaced wheel 140 and the conical guide wheels 152—152 aid in moving and properly orientating the pickles, which, at the proper time, are fed to the pusher compartments moving over platform 162, one pickle being fed thereto as each compartment is moved to beneath the discharge end of the conveyor belt system 10.

The aligning conveyor 16 is positioned in front of the discharge end of the platform 162 so that the pickles will not be bouncing around when they are brought to the conveyor 16. The conveyor 16 moves the pickles against the retainer walls 263 of the pusher members thus aligning one end of the pickles and the points 270 are pushed into the pickles to prevent the pickles from rolling about. Then the pushers move the pickles off the conveyor 16 and onto the angle strips 278. The friction between the pickles and the angle strips is minimal so that the pickles remain impaled on the points 170 of the pusher members. As the ends of the pickles furthest from the pusher member aligning walls 263 loses support, they fall into the opening 272 under force of gravity, and are conveyed by the chutes 173 bins or the like.

The present invention has provided a very simple and reliable pickle feeding and sorting equipment which receives pickles fed at a random rate and properly orients the pickles and feeds them at the proper rate to the main conveyor leading to the sorting equipment. Due to the features of the invention, the pickles are all properly aligned and held in a fixed position with respect to the pusher members as they are brought to the sorting station. By minimizing the possibility of rolling motion of the pickles at the sorting station, substantially all pickles are directed to the proper discharge station.

It should be understood that numerous modifications may be made of the preferred form of the invention above described without deviating from the broader aspects of the invention.

I claim as my invention:

1. Apparatus for feeding pickles and the like one at a time at a definite rate and orientation to a discharge station comprising: an open-ended feed drum mounted for rotation about its longitudinal axis when oriented at a substantial angle to the vertical, said feed drum providing an inclined, moving, inner bottom wall surface which carries pickles or the like fed randomly into one end of the drum into the other end of the drum, circumferentially spaced carrier members mounted within said other drum end and each arranged to receive one pickle at a time, the movement of the drum bringing the carrier members with the pickles or the like thereon from the bottom to the top of the drum, conveyor means extending into the drum end containing the carrier members, a protecting wall circumscribing the end of the conveyor means in the drum for protecting certain parts thereof from contact with the pickles or the like, guide wall means for directing pickles or the like dropped from the top of the drum to the conveyor means, and means for discharging the pickles or the like from the carrier members brought to the top of the drum, said conveyor means including a pair of outer belts at substantially the same elevations, an intermediate endless conveyor belt between said outer conveyor belts and mounted for movement in a path which is somewhat below the path of movement of said outer conveyor belts, for forming a pocket for accurately positioning the pickles or the like transversely thereof, means for receiving the pickles carried by said conveyor belts and for discharging them at said discharge station comprising a pair of closely spaced, coaxially and rotatably mounted feed wheels having opposed inclined surfaces forming a tapered peripheral channel in alignment with said intermediate conveyor belt to receive the pickles or the like therefrom, the inclined tapered surfaces of said feed wheels comprising a number of planar surfaces oriented in polygonal fashion about the axes of rotation thereof to form individual, straight-bottomed recesses for the pickles or the like, a pulley for said intermediate conveyor belt mounted between and coaxially of said feed wheels, the path of movement of said outermost conveyor belts terminating short of said feed wheels and the path of movement of said intermediate conveyor belt extending between said feed wheels over said pulley, means for receiving individual pickles or the like from said feed wheels and for directing the same to said discharge station, and means for driving said outermost and intermediate conveyor belts, said feed wheels and said feed drum in timed relationship.

2. Apparatus for feeding pickles and the like one at a time at a definite rate and orientation to a discharge station, comprising: an open-ended feed drum mounted for rotation about its longitudinal axis oriented at a substantial angle to the vertical, said feed drum providing an inclined, moving, inner bottom wall surface which carries pickles or the like fed randomly into one end of the drum into the other end of the drum, circumferentially spaced carrier members mounted within said other drum end and each arranged to receive one pickle at a time, the movement of the drum bringing the carrier members with the pickles thereon from the bottom to the top of the drum, conveyor means extending adjacent the drum end containing the carrier members, means for discharging the pickles from the carrier members brought to the top of the drum to said conveyor means, means for receiving pickles carried by said conveyor means and for discharging them at the said discharge station comprising a pair of closely spaced, coaxially and rotatably mounted feed wheels having opposed inclined surfaces forming a tapered peripheral channel in alignment with said conveyor means to receive the pickles or the like therefrom, the inclined tapered surfaces of said feed wheels comprising a number of planar surfaces oriented in polygonal fashion about the axes of rotation thereof to form individual, straight-bottomed recesses for the pickles or the like, and means for receiving pickles or the like from said feed wheels.

3. Apparatus for feeding pickles and the like comprising: an open end feed drum oriented with its longitudinal axis extending generally parallel to the horizontal and mounted for rotation about said axis, said drum having a conical portion providing a gradually downwardly sloping, moving bottom wall surface and a cylindrical portion extending coaxially from the wide end of the conical portion, said conical portion having generally longitudinally extending, circumferentially spaced internal ribs which are all inclined in the same direction circumferentially of the associated slant height lines extending from the ribs at the narrow end of the conical drum portion, means for rotating said drum in a direction opposite to the direction of circumferential inclination of said internal ribs whereby the pickles are caused to move down the drum and the agitation of the pickles by the ribs orients the pickles so that their axes extend generally longitudinally of the drum, pickle carrier members in said cylindrical drum portion mounted for tilting movement, a guide dog secured to the end of each of said carrier members, means forming a guide track for said guide dogs which track orients said dogs so that the associated carrier members form pickle support pockets which carry the pickles to the upper portion of the drum, and said track including means at the top of said drum for engaging and tilting said guide dogs when the latter are on top of the drum to tilt the pickle carrier members and thereby discharging the pickles carried thereby.

4. Apparatus for feeding pickles and the like comprising: an open end feed drum oriented with its longitudinal axis extending generally parallel to the horizontal and mounted for rotation about said axis, said drum having a conical portion and a cylindrical portion extending coaxially from the wide end of the conical portion, pickle carrier members of hook-shaped cross section in said cylindrical drum portion mounted for tilting movement about an axis extending longitudinally of the drum, a guide dog secured to the end of each of said carrier members, means forming a guide track for said guide dogs which track orients said dogs so that the associated hook-shaped carrier members form pickle support pockets which carry the pickles to the upper portion of the drum, outfeeding conveyor means extending into the open end of said drum and spaced above the bottom of the drum, and said track including means at the top of said drum for engaging and tilting said guide dogs when the latter are on top of the drum and above said conveyor means for tilting the pickle carrier members and thereby discharging the pickles carried thereby onto the top of said conveyor means.

5. Apparatus for feeding pickles and the like comprising: an open end feed drum oriented with its longitudinal axis extending generally parallel to the horizontal and mounted for rotation about said axis, said drum having a conical portion and a cylindrical portion extending coaxially from the wide end of the conical portion, pickle carrier members in said cylindrical drum portion mounted for tilting movement, a guide dog secured to the end of each of said carrier members, means forming a guide track for said guide dogs which track orients said dogs so that the associated carrier members form pickle support pockets which carry the pickles to the upper portion of the drum, and said track including means at the top of said drum for engaging and tilting said guide dogs when the latter are on top of the drum for tilting the pickle carrier members and thereby discharging the pickles carried thereby.

6. Apparatus for feeding pickles and the like comprising: a carrier support having an upstanding annular portion mounted for rotation about its longitudinal axis, circumferentially spaced tiltably mounted pickle carrier members mounted around the interior of said annular portion of said carrier support, means for rotating said carrier support about said axis, means for directing pickles one at a time to said respective carrier members as the latter are in the lower portion of their path of travel, outfeeding conveyor means extending into said annular portion of said carrier support, and means for tilting said carrier members when they are above said conveyor means to discharge pickles onto the same.

7. Apparatus for feeding pickles and the like comprising: a feed drum open at both ends and oriented so that its longitudinal axis makes a substantial angle to the vertical, said drum being mounted for rotation substantially about its longitudinal axis and having internal wall means inclined with respect to said drum axis to provide moving, bottom pickle-support surface portions inclining downwardly toward one end of the drum, respective pickle carrier members of hook-shaped cross section mounted for tilting movement at said one drum end along axes extending longitudinally of the drum and the hooked ends thereof facing in the direction of rotation of the drum, the carrier members being positioned to receive pickles, one at a time, on the hooked side thereof as they fall by force of gravity along the drum bottom, said carrier members when carried above the bottom of said drum being oriented to cradle the pickles, means for rotating said drum in said circumferential direction, outfeeding conveyor means extending into said one drum end and spaced above the drum bottom, and relatively stationary means at said one drum end for tilting the carrier members about said axes when carried above said conveyor means to thereby discharge the pickles therein onto said conveyor means.

8. Apparatus for feeding pickles and the like comprising: a feed drum open at both ends and oriented so that its longitudinal axis makes a substantial angle to the vertical, said drum being mounted for rotation substantially about its longitudinal axis and having internal wall means inclined with respect to said drum axis to provide moving, bottom, pickle-support surface portions inclining downwardly toward one end of the drum, respective carrier members mounted for tilting movement at said one drum end and being rotatable with the drum, the carrier members being positioned to receive pickles, one at a time, as they fall by force of gravity along the drum bottom, said carrier members when carried above the bottom of said drum being oriented to cradle the pickles, outfeeding conveyor means extending into said one drum end and spaced above the drum bottom, and relatively stationary means at said one drum end for tilting the carrier members when carried above said conveyor means to thereby discharge the pickles therein onto said conveyor means.

9. Apparatus for feeding pickles and the like comprising: a carrier support having an upstanding annular portion mounted for rotation about its longitudinal axis, circumferentially spaced, tiltably mounted pickle carrier members mounted around the interior of said annular portion of said carrier support, means for rotating said carrier support about said axis, means for directing pickles one at a time to said respective carrier members as the latter are in the lower portion of their path of travel, outfeeding conveyor means extending into said annular portion of said carrier support, said carrier members being mounted upon rock shafts extending axially beyond said annular portion, guide dogs fixed to the rock shaft ends, relatively stationary radially spaced annular guide rails mounted coaxially of the axis of rotation of said annular portion for confining said guide dogs to fix the inclination of said carrier members, the carrier members being oriented to cradle pickles in the upper path of travel thereof, and one of said rails having an irregular portion against which the guide dogs ride when the latter are above said conveyor means to tilt the carrier members to discharge pickles upon said conveyor means.

10. Apparatus for feeding pickles and the like to a discharge station comprising: conveyor means including a pair of opposed but spaced apart endless outer conveyor belts for carrying pickles or the like toward said discharge station in paths having substantially the same elevations, an intermediate endless conveyor belt between said outer conveyor belts and mounted for movement in a path which is somewhat below said outer conveyor belts, for forming a pocket for accurately positioning the pickles or the like transversely thereof, means for moving said conveyor belts toward said discharge station at approximately the same speed, and a pair of closely spaced, coaxially and rotatably mounted feed wheels having opposed inclined surfaces forming a tapered peripheral channel in alignment with said intermediate conveyor belt, said opposed inclined surfaces being adapted to receive and raise pickles from said intermediate conveyor above the same, and the path of movement of said intermediate conveyor belt extending between said feed wheels and the path of movement of said outermost conveyor belts terminating short of said feed wheels.

11. Apparatus for feeding pickles and the like to a discharge station comprising: conveyor means including a pair of opposed but spaced apart endless outer conveyor belts for carrying pickles or the like toward said discharge station in paths having substantially the same elevations, an intermediate endless conveyor belt between said outer conveyor belts and mounted for movement in a path which is somewhat below said outer conveyor belts, for forming a pocket for accurately positioning the pickles or the like transversely thereof, means for moving said conveyor belts toward said discharge station at approximately the same speed, and a pair of closely spaced, coaxially and rotatably mounted feed wheels having opposed inclined planar surfaces arranged in polygonal fashion around the axes of rotation thereof and forming a tapered peripheral channel in alignment with said intermediate conveyor belt, said opposed inclined surfaces being adapted to receive and raise pickles from said intermediate conveyor above the same, and the path of movement of said intermediate conveyor belt extending between said feed wheels and the path of movement of said outermost conveyor belts terminating short of said feed wheels.

12. In a machine for grading pickles or the like comprising: a platform having a supply end and a discharge end, means at the discharge end of the platform for forming a tapered sorting opening, said opening having a straight longitudinal edge and an opposite longitudinal edge which provides a tapered opening having a width, measured transversely of the platform, which progressively increases in a direction away from the supply end of the platform, a plurality of pusher members arranged above said platform for movement between the supply and discharge ends of said platform, each of said pusher members having a front wall surface facing toward the discharge end of the platform, a sharp projection for impaling the pickles or the like extending forwardly from each pusher front wall surface, and aligning wall means extending at right angles to said front wall surface and aligned with said straight longitudinal edge, means for feeding pickles or the like onto the platform adjacent the supply end thereof in front of a pusher member, transverse conveyor means between the supply end of the platform and said sorting opening for transversely moving the pickles or the like against said aligning wall means to align one end of the same longitudinally of said sorting opening, and means for advancing the pusher members along the platform from the supply end toward the discharge end for causing said sharp projections to pierce the aligned pickles or the like and for carrying the same to said sorting opening.

13. In a machine for grading pickles or the like comprising: a platform having a supply end and a discharge end, means at the discharge end of the platform for forming a tapered sorting opening, said opening having a straight longitudinal edge and an opposite longitudinal edge which provides a tapered opening having a width, measured transversely of the platform, which progressively increases in a direction away from the supply end of the platform, a plurality of pusher members arranged transversely above said platform, each of said pusher members having a front wall surface facing toward the discharge end of the platform, a sharp projection for impaling the pickles or the like extending forwardly from each pusher front wall surface, aligning wall means extending from each pusher member at right angles to said front wall surface and each being in alignment with the corresponding wall of the adjacent pusher member longitudinally of the platform, means for feeding pickles or the like onto the platform adjacent the supply end thereof in front of a pusher member, transverse conveyor means between the supply end of the platform and said sorting opening for transversely moving the pickles or the like against said pusher member aligning wall means to align one end of the same longitudinally of said sorting opening, and means for advancing the pusher members along the platform from the supply end toward the discharge end for causing said sharp projections to pierce the aligned pickles or the like and for carrying the same to said sorting opening.

14. In a machine for grading pickles or the like comprising: a platform having a supply end and a discharge end, means at the discharge end of the platform for forming a tapered sorting opening, said opening having one straight edge and an opposite edge which provides a tapered opening having a width, measured between said edges, which progressively increases in a direction away from the supply end of the platform, and a plurality of pusher members above said platform for moving pickles or the like over said platform and sorting opening in a direction parallel to said straight edge of said sorting opening, each pulser member having a sharp projection on the front thereof for impaling the pickles to hold them in position over said sorting opening.

15. In a machine for grading pickles or the like comprising: a platform having a supply end and a discharge end, means at the discharge end of the platform for forming a tapered sorting opening, said opening having one straight edge and an opposite edge which provides a tapered opening having a width, measured between said edges, which progressively increases in a direction from the supply end of the platform, said last-mentioned means comprising a number of spaced rib means forming support surfaces of limited area upon which the pickles may slide with a minimum of friction, the rib means extending contiguous to said opposite edge of said opening, and a plurality of pusher members above said platform for moving pickles or the like over said platform and sorting opening in a direction parallel to said straight edge of said sorting opening, each pusher member being slidable upon said platform and having a sharp projection on the front thereof for impaling the pickles to hold them in position over said sorting opening.

16. A machine for grading pickles or the like comprising: a platform having a supply station at one end and a discharge station at the other end, means at the discharge end of the platform providing a sorting opening having a pair of opposite sides which diverge relative to one another in a direction extending away from the supply end of the platform, a plurality of pusher members arranged for movement forwardly toward the discharge end thereof above said platform, each pusher member having a main body portion including a front wall surface, a sharp projection for impaling pickles or the like extending forwardly from said front wall surface, and an end wall extending transversely of the associated front wall surface and in the same direction from each pusher body to a point contiguous to the adjacent pusher body to form separate compartments between adjacent pusher members, said end wall being aligned generally with a side edge of said sorting opening, the end walls of said pusher members on said platform being in alignment, means for advancing the pusher members along the platform from the supply end toward the discharge end thereof and then over said sorting opening where the pickles are moved generally longitudinally of said opposite sides of said sorting opening, means for feeding pickles or the like onto the platform adjacent the supply end thereof in timed relation with the movement of the conveyor means so that a pickle or the like is contained in each compartment between adjacent pusher members, and transverse conveyor means located between the supply end of said platform and said sorting openings for transversely moving the pickles or the like against said pusher member end walls to align one end of the same longitudinally of the sorting opening.

17. Apparatus for feeding and grading pickles or the like comprising: an open-ended feed drum mounted for rotation about its longitudinal axis oriented at a substantial angle to the vertical, said feed drum providing an inclined, moving inner bottom wall surface which carries pickles or the like fed randomly into one end of the drum into the other end of the drum, circumferentially spaced carrier members mounted within said other drum end and each arranged to scoop a pickle or the like from the drum bottom and carry the same to the top of the drum, the movement of the drum bringing the carrier members with the pickles or the like carried thereon from the bottom to the top of the drum, means for discharging the pickles or the like one at a time from said carrier members as they are brought adjacent the top of the drum and for carrying the same one at a time to a discharge station, means forming an elongated sorting opening having a progressively increasing width, conveyor means extending from said discharge station and longitudinally over said sorting opening for receiving pickles or the like one at a time from said discharge station and conveying them longitudinally over said sorting opening proceeding from the narrow to the wide end thereof, said conveyor means having individual receiving stations for respectively receiving the pickles or the like delivered one at a time to said discharge station, and means for rotating said drum and moving said conveyor means in timed relation.

18. Apparatus for feeding and grading pickles or the like comprising: an open-ended feed drum mounted for rotation about its longitudinal axis oriented at a substantial angle to the vertical, said feed drum providing an inclined, moving inner bottom wall surface which carries pickles or the like fed randomly into one end of the drum into the other end of the drum, circumferentially spaced carrier members mounted within said other drum end and each arranged to scoop a pickle or the like from the drum bottom and carry the same to the top of the drum, the movement of the drum bringing the carrier members with the pickles or the like carried thereon from the bottom to the top of the drum, means for discharging the pickles or the like one at a time from said carrier members as they are brought adjacent the top of the drum and for carrying the same one at a time to a discharge station, means forming an elongated sorting opening having a progressively increasing width, platform means extending between said discharge station and said sorting opening, conveyor means including individual compartments or the like movable over the platform and longitudinally over the sorting opening for receiving pickles or the like one at a time from said discharge station and conveying them longitudinally over said sorting opening proceeding from the narrow to the wide end thereof, said conveyor means having projections extending from the leading side of each compartment thereof for impaling the pickles or the like to hold them steady when moved over said sorting opening where they fall by force of gravity at positions therealong which are a function of their size, and means for rotating the drum and moving said conveyor means in timed relation.

References Cited in the file of this patent

UNITED STATES PATENTS

| | | |
|---|---|---|
| 663,681 | Nichols | Dec. 11, 1900 |
| 1,103,970 | Kemp | July 21, 1914 |
| 1,204,685 | Phillips et al. | Nov. 12, 1916 |
| 1,350,154 | Hamilton | Aug. 17, 1920 |
| 1,492,867 | Thompson | May 6, 1924 |
| 1,888,709 | Whisnand et al. | Nov. 22, 1932 |
| 2,198,463 | Scott | Apr. 23, 1940 |
| 2,392,044 | Horsfield | Jan. 1, 1946 |
| 2,428,370 | Kelly | Oct. 7, 1947 |
| 2,697,515 | Guigas | Dec. 21, 1954 |
| 2,755,929 | Prenveille | July 24, 1956 |
| 2,786,573 | Lagarde | Mar. 26, 1957 |
| 2,787,362 | Hill | Apr. 2, 1957 |

FOREIGN PATENTS

| | | |
|---|---|---|
| 202,084 | Australia | June 13, 1956 |
| 459,189 | France | Aug. 29, 1913 |